US012419423B2

(12) United States Patent
Dressel et al.

(10) Patent No.: US 12,419,423 B2
(45) Date of Patent: Sep. 23, 2025

(54) COUPLING DEVICE AND METHOD FOR COUPLING PANELS

(71) Applicant: Honda Motor Co., Ltd., Tokyo (JP)

(72) Inventors: Brian E. Dressel, Worthington, OH (US); So Nakaura, Wako (JP); Satoshi Hayashi, Wako (JP); Travis W. Cannady, Marysville, OH (US); Geemay Chia, Pasadena, CA (US)

(73) Assignee: Honda Motor Co., Ltd., Tokyo (JP)

( * ) Notice: Subject to any disclaimer, the term of this patent is extended or adjusted under 35 U.S.C. 154(b) by 249 days.

(21) Appl. No.: 18/181,153

(22) Filed: Mar. 9, 2023

(65) Prior Publication Data
US 2024/0298803 A1 Sep. 12, 2024

(51) Int. Cl.
*A47C 5/10* (2006.01)
*A47C 4/02* (2006.01)
*A47C 7/14* (2006.01)
*F16B 17/00* (2006.01)
*F16B 21/06* (2006.01)

(52) U.S. Cl.
CPC ............. *A47C 5/10* (2013.01); *A47C 4/021* (2013.01); *A47C 7/14* (2013.01); *F16B 17/004* (2013.01); *F16B 21/065* (2013.01)

(58) Field of Classification Search
CPC ......... A47C 5/10; A47C 4/021; F16B 17/004; F16B 21/065
USPC ............... 297/19, 219.1, 228.11; 108/90, 77
See application file for complete search history.

(56) References Cited

U.S. PATENT DOCUMENTS

| 299,670 | A | * | 6/1884 | Nash ...................... A47C 1/143 297/114 |
| 2,964,173 | A | | 12/1960 | Schnable |
| 3,346,155 | A | | 10/1967 | Oechsle |
| 3,913,289 | A | | 10/1975 | Recker |
| 3,917,102 | A | | 11/1975 | Repetti |
| 4,188,067 | A | | 2/1980 | Elmer |
| 4,441,756 | A | * | 4/1984 | Liou ....................... A47C 1/03 297/423.26 |
| 4,489,815 | A | | 12/1984 | Martinez et al. |

(Continued)

FOREIGN PATENT DOCUMENTS

| CA | 2877240 C | 5/2022 |
| CN | 4003704 A1 | 8/1991 |

(Continued)

OTHER PUBLICATIONS

Office Action of U.S. Appl. No. 18/181,190 dated Oct. 30, 2024, 27 pages.

(Continued)

*Primary Examiner* — Jose V Chen
(74) *Attorney, Agent, or Firm* — Rankin, Hill & Clark LLP

(57) ABSTRACT

A coupling device and method for removably coupling frames of a modular panel system includes a first coupling body fixedly and rotatably connected to a first panel frame of a first panel and a second coupling body fixedly and rotatably connected to a second panel frame of a second panel. The first and second coupling bodies are removably coupled to one another in a coupled state to thereby couple the first panel and the second panel together and are decoupled from one another in a decoupled state to thereby decouple the first panel and the second panel from one another.

17 Claims, 5 Drawing Sheets

(56) References Cited

U.S. PATENT DOCUMENTS

| | | | |
|---|---|---|---|
| 4,687,248 A | 8/1987 | Ross et al. | |
| 4,784,436 A | 11/1988 | Sutherland | |
| 4,811,437 A | 3/1989 | Dillner et al. | |
| 4,984,906 A | 1/1991 | Little | |
| 5,150,501 A | 9/1992 | Pasternak | |
| 5,251,945 A | 10/1993 | Stoops | |
| 5,251,956 A | 10/1993 | Hofmeyer | |
| 5,582,458 A | 12/1996 | Wildt | |
| 5,588,696 A | 12/1996 | Jay et al. | |
| 5,709,155 A * | 1/1998 | Terracciano | A47C 7/70 297/145 |
| 5,863,088 A | 1/1999 | Kelly, Sr. et al. | |
| 6,068,355 A | 5/2000 | Thorp | |
| 6,557,955 B2 | 5/2003 | Saravis | |
| 6,705,338 B2 | 3/2004 | Zheng | |
| 6,843,529 B2 | 1/2005 | Ballendat | |
| 7,048,333 B2 | 5/2006 | Martinez | |
| 7,213,356 B2 | 5/2007 | Haggard, Jr. | |
| 7,963,404 B2 | 6/2011 | Shang | |
| 8,082,971 B1 | 12/2011 | Peterson et al. | |
| 8,312,596 B2 | 11/2012 | Self | |
| 8,387,676 B2 | 3/2013 | Hunckler et al. | |
| 8,449,026 B1 | 5/2013 | Gutierrez et al. | |
| 8,782,853 B2 | 7/2014 | Ge | |
| 8,938,855 B2 | 1/2015 | Ahn et al. | |
| 8,955,928 B2 | 2/2015 | Cheng | |
| 9,226,576 B2 | 1/2016 | Shang et al. | |
| 9,441,358 B2 | 9/2016 | Harman et al. | |
| 9,445,666 B2 | 9/2016 | Chang | |
| 9,516,947 B2 | 12/2016 | Taylor | |
| 9,527,626 B1 | 12/2016 | Coronado | |
| 9,714,533 B2 | 7/2017 | Kuramochi | |
| 9,879,471 B2 | 1/2018 | Lewis et al. | |
| 9,915,086 B2 * | 3/2018 | Kato | E05D 11/087 |
| 10,064,466 B2 | 9/2018 | Fulton et al. | |
| 10,202,735 B2 | 2/2019 | Heselden | |
| 10,531,740 B2 | 1/2020 | Graybill | |
| 10,561,215 B1 | 2/2020 | Klein | |
| 10,720,085 B2 | 7/2020 | Lorenzo | |
| 10,880,416 B2 | 12/2020 | Li et al. | |
| 11,160,376 B2 | 11/2021 | Gass | |
| 11,193,299 B2 | 12/2021 | Andre et al. | |
| 11,234,526 B1 | 2/2022 | Levin | |
| 11,234,527 B2 | 2/2022 | Hsu Besner et al. | |
| 11,317,600 B2 | 5/2022 | Huthmaker et al. | |
| 11,382,404 B2 | 7/2022 | Davies | |
| 2003/0172493 A1 | 9/2003 | Christiansen et al. | |
| 2004/0182900 A1 | 9/2004 | Brown et al. | |
| 2005/0122671 A1 | 6/2005 | Homer | |
| 2005/0236450 A1 | 10/2005 | Iannini | |
| 2007/0057542 A1 * | 3/2007 | Rush | A61G 1/017 297/219.1 |
| 2007/0176462 A1 | 8/2007 | Lombardo | |
| 2009/0108968 A1 | 4/2009 | Tsai et al. | |
| 2009/0121534 A1 | 5/2009 | Brauning | |
| 2010/0306917 A1 | 12/2010 | Batiste | |
| 2012/0317719 A1 | 12/2012 | Ng | |
| 2013/0011181 A1 | 1/2013 | Riedmueller | |
| 2014/0021749 A1 * | 1/2014 | Roani | A47C 4/28 297/16.1 |
| 2014/0069970 A1 | 3/2014 | Thomas, Jr. | |
| 2014/0368986 A1 | 12/2014 | Lin | |
| 2015/0102080 A1 | 4/2015 | Bullock | |
| 2015/0125235 A1 * | 5/2015 | Benthien | B60R 16/0215 411/72 |
| 2018/0142718 A1 | 5/2018 | Zhu | |
| 2021/0235828 A1 | 8/2021 | Yeh | |
| 2022/0022654 A1 * | 1/2022 | Fraser | A47C 4/42 |
| 2022/0113771 A1 | 4/2022 | Wu et al. | |
| 2022/0412140 A1 * | 12/2022 | Young | E05D 7/1066 |
| 2023/0323733 A1 | 10/2023 | Gibbs, Jr. et al. | |
| 2024/0301901 A1 * | 9/2024 | Dressel | F16B 5/0607 |
| 2024/0301902 A1 * | 9/2024 | Hayashi | F16B 21/065 |

FOREIGN PATENT DOCUMENTS

| | | |
|---|---|---|
| CN | 2817601 Y | 9/2006 |
| CN | 203926360 U | 11/2014 |
| CN | 209548670 U | 10/2019 |
| CN | 210799708 U | 6/2020 |
| CN | 213154911 U | 5/2021 |
| CN | 111043149 B | 9/2021 |
| CN | 112392850 B | 3/2022 |
| CN | 216797153 U | 6/2022 |
| DE | 202006001105 U1 | 5/2006 |
| EP | 2532275 B1 | 4/2014 |
| EP | 3987976 A1 | 4/2022 |
| GB | 2413056 A | 10/2005 |
| GB | 2598425 A | 3/2022 |
| WO | WO-9009749 A1 * | 9/1990 |
| WO | WO2010046521 A1 | 4/2010 |
| WO | WO2013132355 A3 | 12/2013 |
| WO | WO2019150165 A1 | 8/2019 |

OTHER PUBLICATIONS

Office Action of U.S. Appl. No. 18/181,190 dated Mar. 6, 2025, 29 pages.

Office Action of U.S. Appl. No. 18/390,376 dated Jul. 1, 2025, 39 pages.

Office Action of U.S. Appl. No. 18/181,156 dated Jun. 16, 2025, 43 pages.

Notice of Allowance of U.S. Appl. No. 18/181,190 dated Jun. 24, 2025, 14 pages.

* cited by examiner

COUPLING DEVICE AND METHOD FOR COUPLING PANELS

BACKGROUND

A variety of collapsible panel systems are known. Also a variety of collapsible furniture structures are known. Nonetheless, there remains a need for easily transportable collapsible structures, including panel systems that are collapsible and configurable into various useful structures, such as furniture. In particular, disadvantages of known collapsible furniture and panel systems includes the following: difficult to assemble and disassemble, difficult to transport, configurable in only a limited configuration or a few configurations, etc.

BRIEF DESCRIPTION

According to one aspect, a coupling device for coupling panels of a modular panel system includes a first coupling body fixedly and rotatably secured to an associated first panel and a second coupling body fixedly and rotatably secured to an associated second panel. The first and second coupling bodies are removably coupleable together to removably couple the associated first and second panels to one another.

According to another aspect, a coupling device for coupling frames of panels includes a first coupling body fixedly and rotatably connected to a first panel frame of a first panel and a second coupling body fixedly and rotatably connected to a second panel frame of a second panel. The first and second coupling bodies are removably coupled to one another in a coupled state to thereby couple the first panel and the second panel together and are decoupled from one another in a decoupled state to thereby decouple the first panel and the second panel from one another.

According to a further aspect, a method for removably coupling panels of a modular panel system includes providing a first coupling body fixedly and rotatably secured to a first panel and a second coupling body fixedly and rotatably secured to a second panel. The method further includes removably coupling the first coupling body and the second coupling body together to removably couple the first and second panels to one another.

DETAILED DESCRIPTION

It should, of course, be understood that the description and drawings herein are merely illustrative and that various modifications and changes can be made in the structures disclosed without departing from the present disclosure. Spatially relative terms may be used to describe an element and/or features relationship to another element(s) and/or feature(s) as, for example, illustrated in the figures. Moreover, any term of degree used herein, such as "substantially" and "approximately" means a reasonable amount of deviation of the modified word is contemplated such that the end result is not significantly changed.

Figure 1:
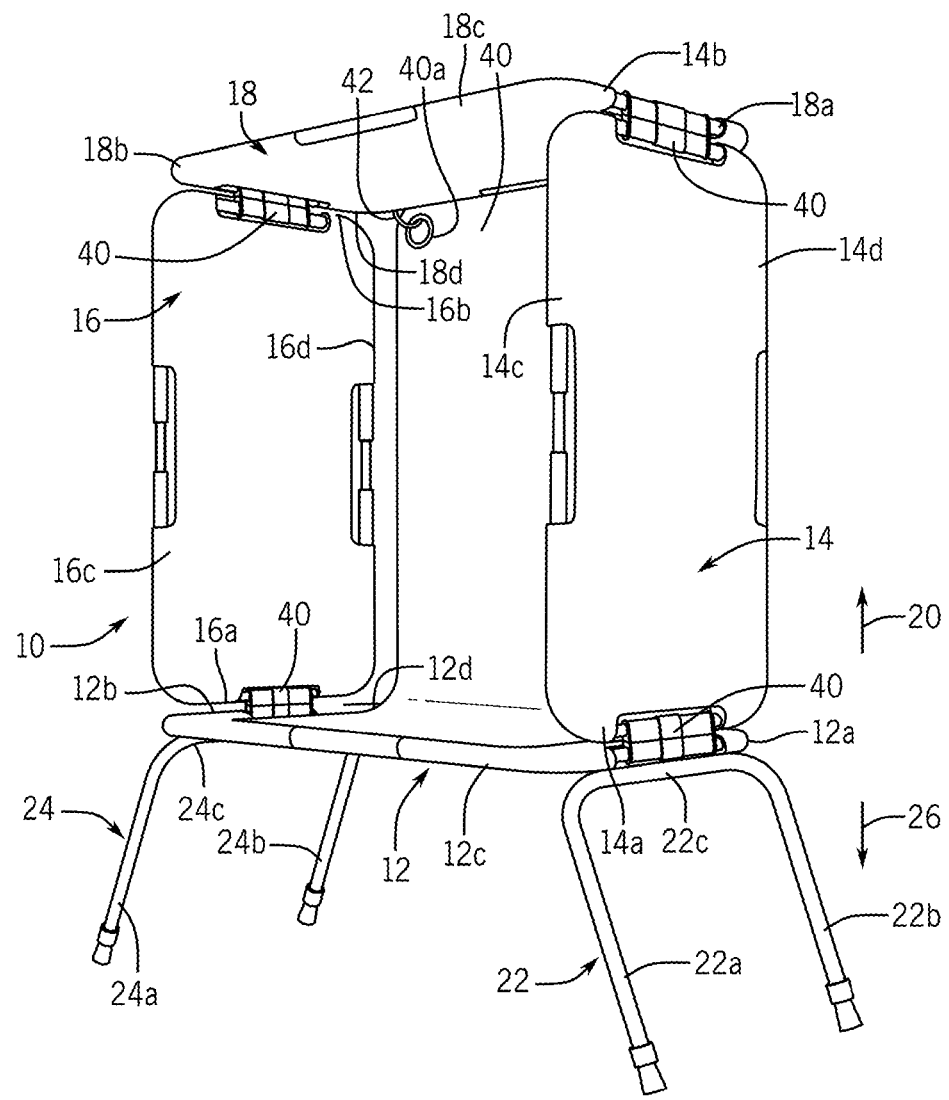
FIG. 1 is a schematic perspective view of a modular panel system shown in an assembled state in a shade chair configuration, the modular panel system having a plurality of coupling devices for removably coupling adjacent panels together according to one aspect of the present disclosure.

Referring now to the drawings, wherein like numerals refer to like parts throughout the several views, FIG. 1 illustrates a modular panel system 10 according to one embodiment of the present disclosure. More particularly, the modular panel system 10 of the illustrated embodiment is shown in an assembled state and particularly in a shade chair configuration. The modular panel system 10 of the illustrated embodiment includes a first panel 12, a second panel 14, a third panel 16, and a fourth panel 18. The second panel 14 is removably connected to the first panel 12 at a lower end thereof (i.e., at end edge portion 14a) and likewise the third panel 16 is removably connected to the first panel 12 at a lower end thereof (i.e., end edge portion 16a) but in laterally spaced relation relative to the second panel 14. The fourth panel 18 is removably connected to the second and third panels 14, 16 at respective upper ends thereof (i.e., end edge portions 14b and 16b) in spaced relation relative to the first panel 12.

As shown, in the assembled state in the shade chair configuration, the first panel 12 provides an elevated seating platform, such as for a person (not shown) to sit. The other panels 14, 16, 18 can provide at least one of shade, privacy or an enclosure effect to the first panel 12. The modular panel system 10 of the illustrated embodiment is shown including four panels, i.e., panels 12, 14, 16, 18. However, it is to be understood by those skilled in the art that fewer than four panels could be included or more than four panels could be included as part of the modular panel system 10 and these could provide other configurations in the assembled state than the illustrated shade chair.

More particularly, each of the panels 12, 14, 16, 18 includes edge portions, particularly including end edge portions (e.g., end edge portions 12a, 12b, 14a, 14b, 16a, 16b, 18a, 18b) spaced apart from one another to define a panel length for a particular panel and lateral edge portions (e.g., lateral edge portions 12c, 12d, 14c, 14d, 16c, 16d, 18c, 18d) spaced apart from one another to define a width for the particular panel with each lateral edge portion extending from one of the end edge portions to the other of the end edge portions of a particular panel. In one embodiment, each of the panels 12, 14, 16, 18 can be identical to one another, though this is not required. Specifically, the first panel 12 can include edge portions 12a, 12b, 12c and 12d that include end edge portions 12a, 12b spaced apart from one another to define a panel length for the first panel 12 (i.e., first panel length), and lateral edge portions 12c, 12d spaced apart from one another to define a panel width for the first panel 12 (i.e., first panel width) with each of the lateral edge portions 12c, 12d extending from one of the end edge portions 12a or 12b (e.g., end edge portion 12a) to the other of the end edge portions 12a or 12b (e.g., end edge portion 12b).

In the illustrated embodiment, the second panel 14 can be the same as the first panel 12. Accordingly, the second panel 14 can likewise include end edge portions 14a, 14b, 14c, 14d, including end edge portions 14a, 14b spaced apart from one another to define a panel length of the second panel 14 (i.e., second panel length), and lateral edge portions 14c, 14d spaced apart from one another to define a panel width of the second panel 14 (i.e., second panel width) with each of the lateral edge portions 14c, 14d extending from one of the end edge portions 14a or 14b (e.g., end edge portion 14a) to the other of the end edge portions 14a or 14b (e.g., end edge portion 14b). Since the panels 12 and 14 are identical to one another in the illustrated embodiment, the second panel length and second panel width of the second panel 14 are, respectfully, the same as the first panel length and the first panel width of the first panel 12. As will be described in more detail below, the first and second panels 12, 14 are configured to be removably coupled to one another (e.g., by the coupling device 40) by having respective edge portions, particularly edge portions 12a and 14a of each of the first and second panels 12, 14, arranged longitudinally adjacent to one another and removably coupled together. This removable coupling can be enabled by a coupling device or member, such as coupling device 40, as will be described in more detail below.

As already mentioned, the third and fourth panels 16, 18 can also be identical to the first panel 12. Accordingly, each of these panels 16, 18 includes edge portions, including end edge portions (end edge portions 16a, 16b for the third panel 16 and end edge portions 18a, 18b for the fourth panel 18) spaced apart from one another to define a panel length, and lateral edge portions (lateral edge portions 16c, 16d for the third panel 16 and lateral edge portions 18c, 18d for the fourth panel 18) spaced apart from one another to define a panel width with each of the lateral edge portions extending from one of the end edge portions to the other of the end edge portions. The third panel 16 and the fourth panel 18 are each configured to be removably coupled to the other panels 12, 14, 16, 18 by additional coupling devices 40. For example, in FIG. 1, end edge portion 16a of the third panel 16 is arranged longitudinally adjacent the end edge portion 12b and removably coupled thereto by a second coupling device 40. End edge portion 16b of the third panel 16 is arranged longitudinally adjacent the end edge portion 18b of the fourth panel 18 and removably coupled thereto by a further coupling device 40. End edge portion 14b is arranged longitudinally adjacent the end edge portion 18a of the fourth panel and removably coupled thereto by still another coupling device 40.

Since the third panel 16 is the same as the first and second panels 12, 14, the panel length and panel width of the third panel 16 are, respectively, the same as the panel length and panel width of the first panel 12 and the second panel 14. Similarly, since the fourth panel is the same in size and shape as the first, second, and third panels 12, 14, 16, the panel length and panel width of the fourth panel 18 are, respectively, the same as the panel length and panel width of each of the first panel 12, the second panel 14, and the third panel 16.

In the assembled configuration of FIG. 1, the first, second, third, and fourth panels 12, 14, 16, 18 are specifically orthogonally arranged to form a rectangular structure or configuration, which can be referred to as a shade chair configuration as mentioned above. In particular, the end edge portions of the first, second, third, and fourth panels 12, 14, 16, 18 are secured to one another by the coupling devices 40 such that the second and third panels, 14, 16 are spaced apart from one another and are secured to both the first and fourth panels 12, 18 with the first and fourth panels 12, 18 spaced apart from one another. In particular, the second and third panels 14, 16 extend in a first direction illustrated by arrow 20 away from the first panel 12.

In addition, as shown, the modular panel system 10 can include at least one leg attachment member, such as the illustrated leg attachment members 22, 24. In particular, in the illustrated embodiment, the at least one leg attachment member includes two leg attachment members 22, 24. Each of these leg attachment members 22, 24 is removably secured to the first panel 12 at the end edge portions 12a, 12b and extends substantially in a second direction illustrated by arrow 26 away from the first panel 12 that is opposite the first direction represented by arrow 20. As shown, the first leg attachment member 22 can be removably secured to a first one of the end edge portions of the first panel 12, namely the end edge portion 12a, and the second leg attachment member 24 can be secured to a second one of the end edge portions of the first panel 12, namely the end edge portion 12b that is opposite the first end edge portion 12a.

The leg attachment members 22, 24 in the illustrated embodiment are each formed as a U-shaped structure. Accordingly, the first leg attachment member 22 includes leg portions 22a, 22b connected together by an attachment portion 22c. The attachment portion 22c is removably coupled to the end edge portion 12a. Likewise, the second leg attachment member 24 can include leg portions 24a, 24b and an attachment portion 24c removably coupled to the end edge portion 12b. The attachment portions 22c, 24c can be removably coupled to the respective end edge portions 12a, 12b of the first panel 12 through any known removable connection as will be understood and appreciated by those skilled in the art. For example, the leg attachment portions 22c, 24c can include a snap-fit removable coupling, a screw-type coupling, a cam-lock type coupling, etc. (none of which are shown). Additionally, the leg attachment members 22, 24, and particularly the leg portions 22a, 22b, 24a, 24b thereof can be or include telescoping legs so as to be height adjustable. In the assembled state and configuration of FIG. 1 (i.e., the shade chair configuration), adjusting the telescoping height of the leg portions 22a, 22b, 24a, 24b can selectively raise and lower a desired height of the panels 12, 14, 16, 18 as might be advantageous when choosing a height for the first panel 12 on which to sit.

Figure 2:
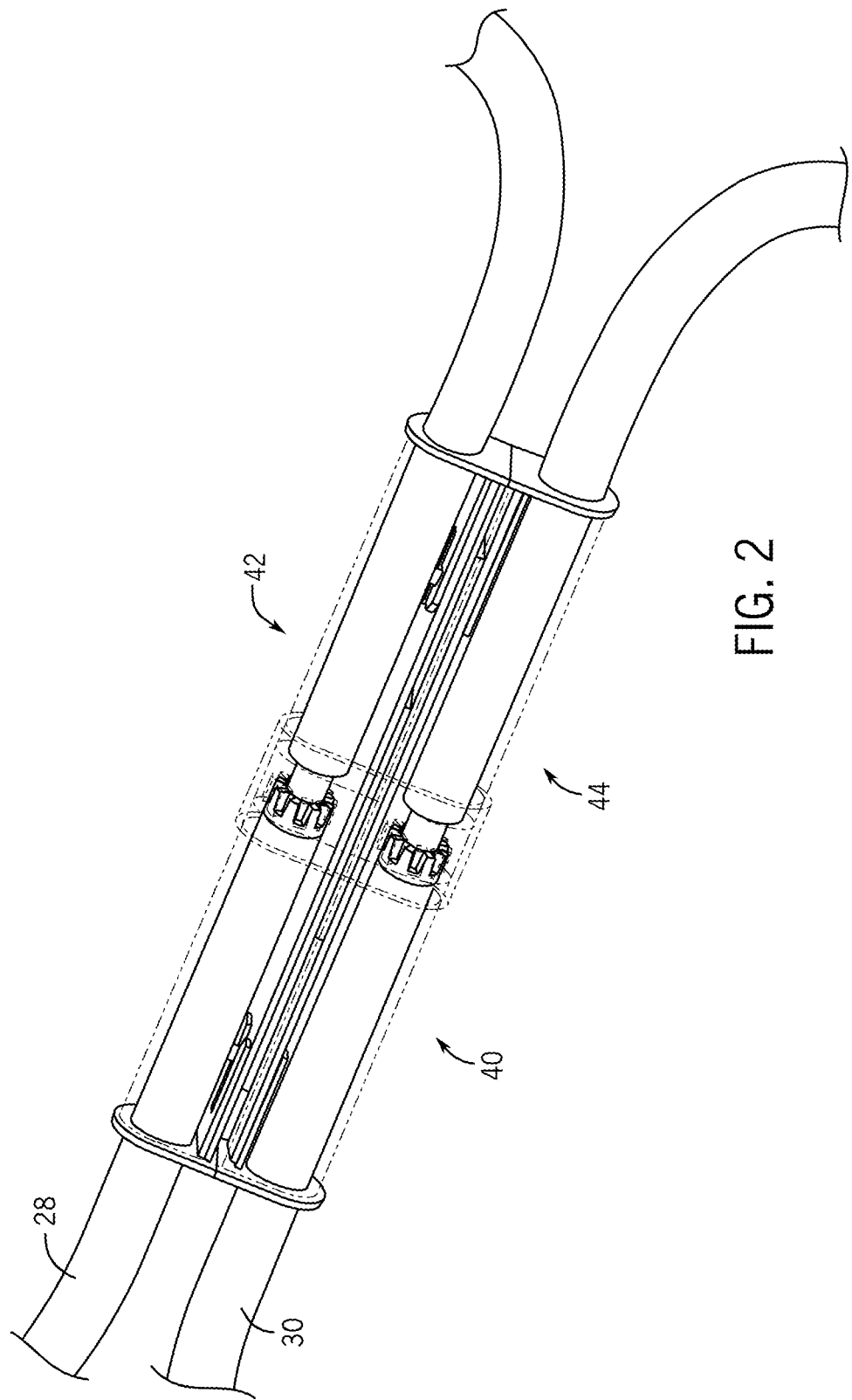
FIG. 2 is a perspective view of one of the coupling devices of the modular panel system of FIG. 1 shown coupling frames of the panels according to one aspect of the present disclosure.
Figure 3:
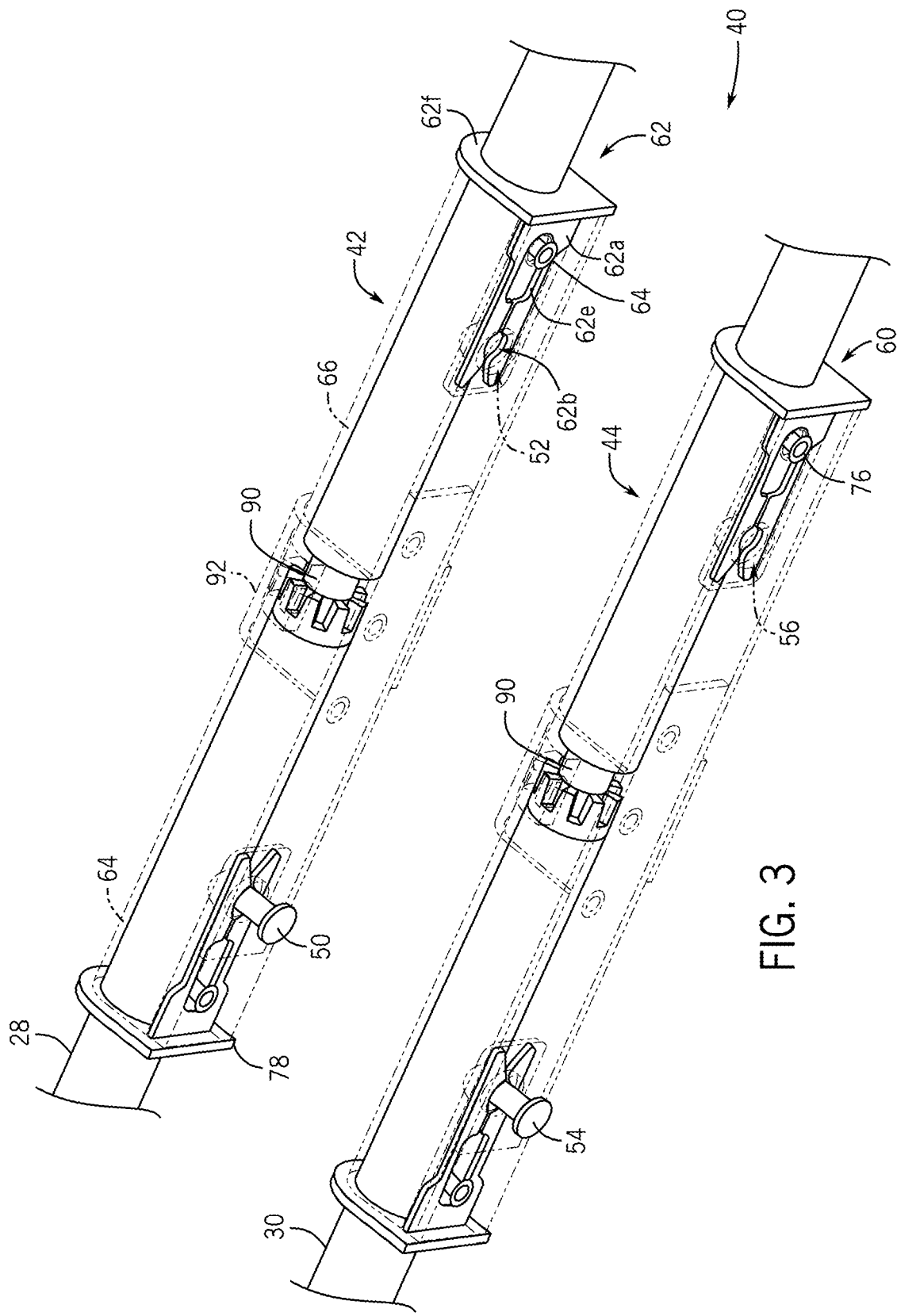
FIG. 3 is a perspective view of the coupling device of FIG. 2 but shown with coupling bodies of the coupling device decoupled from one another.
Figure 4:
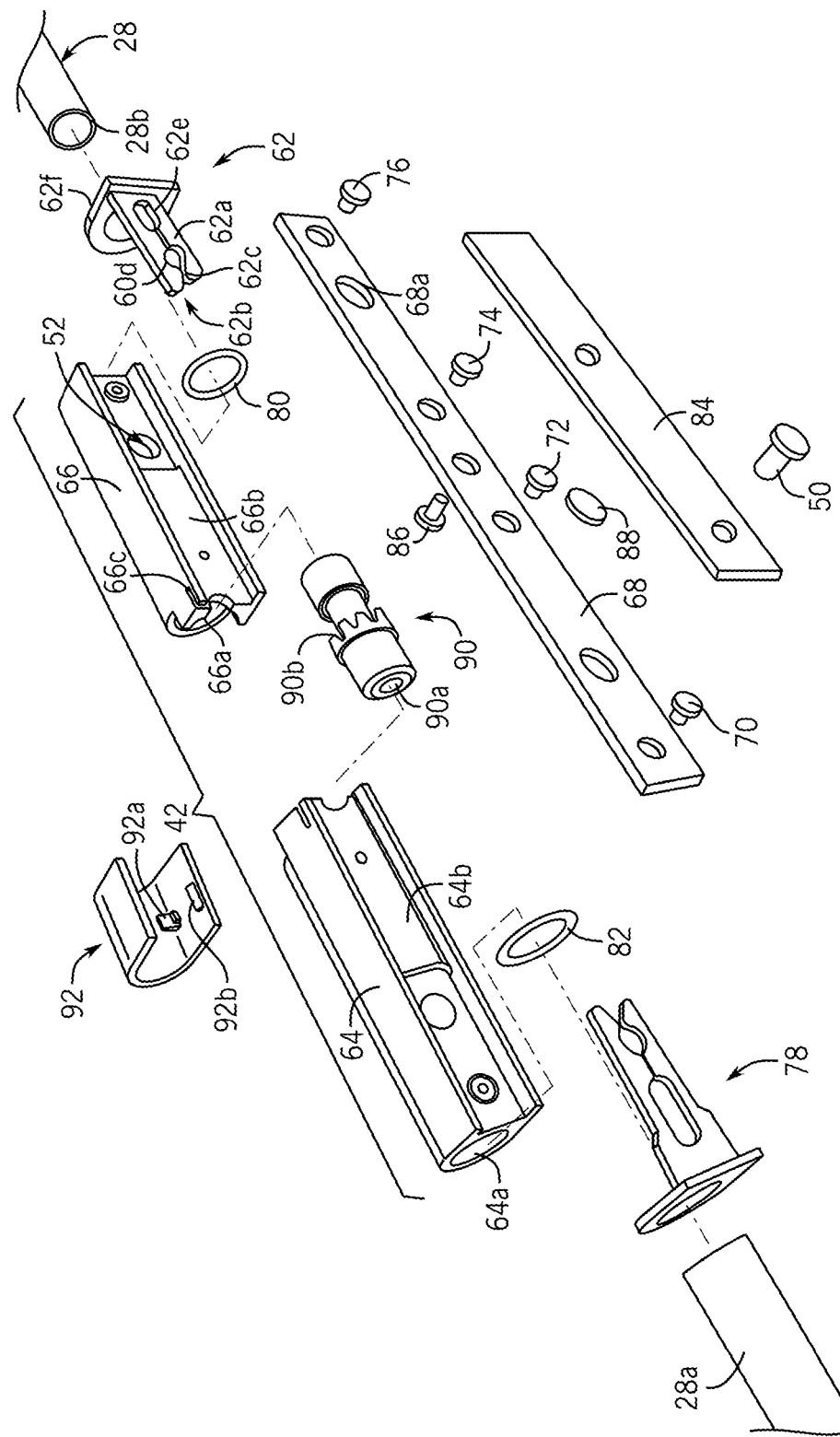
FIG. 4 is an exploded perspective view of the coupling device of FIG. 2.

With additional reference to FIGS. 2, 3 and 4, one of the coupling devices 40 of the modular panel system 10 is illustrated apart from the modular panel system 10. In particular, and as mentioned above, the coupling device 40 is provided for removably coupling the panels, for example, panels 12, 14, 16, 18, of the modular panel system 10, and allowing the panels 12, 14, 16, 18 to be angularly moved relative to one another when coupled by the coupling device 40. In particular, the modular panel system 10 of the illustrated embodiment of FIG. 1 includes four (4) removable coupling devices 40. In one embodiment, the modular panel system 10 is that described in commonly owned U.S. patent application Ser. No. 18/181,156, entitled "MODULAR PANEL SYSTEM, KIT, AND METHOD" that is filed concurrent with the subject application on Mar. 9, 2023, and is expressly incorporated herein in its entirety by reference, but substitutes the coupling member 40 described herein.

As shown and will be described in more detail below, the coupling device 40 is fixedly secured to frames 28, 30, which can be the frames of the first and second panels 12, 14 of FIG. 1. In particular, according to one aspect, the coupling device 40 can include a first coupling body 42 fixedly and rotatably secured to the first panel 12, and particularly to the frame 28 of the first panel 12, and a second coupling body 44 fixedly and rotatably secured to the second panel 14, and particularly to the frame 30 of the second panel 14

As will be described in more detail below, the first and second coupling bodies 42, 44 are removably couplable together (i.e., to one another) to removably couple the first and second panels 12, 14 to one another, and particularly to couple the frames 28, 30 of the first and second panels 12, 14 to one another. Accordingly, the first and second coupling bodies 42, 44 are removably coupled to one another in a coupled state (i.e., the state shown in FIG. 2) to thereby couple the first panel 12 and the second panel 14 together and are decoupled from one another in a decoupled state (the state shown in FIG. 3) to thereby decouple the first panel 12 and the second panel 14 from one another. Specifically, the first coupling body 42 is fixedly and rotatably secured to the frame 28 of the first panel 12 (also referred to herein as a first panel frame 28), and particularly to the frame 28 at an end edge portion 12a of the first panel 12, and the second coupling body 44 is fixedly and rotatably secured to the second panel frame 30 of the second panel 14 (also referred to herein as a second panel frame 30) at an end edge portion 14a of the second panel 14. In the illustrated embodiment, the frames 28, 30 are tubular and can be referred to as tubular portions of the first and second panels 18, 20 (i.e., the and second panel frames each include a tubular portion at respective end portions of the panels 12, 14). The modular panel system 10 of FIG. 1 can similarly use additional coupling devices 40 for connecting the first panel 12 to the third panel 16 and for connecting the fourth panel 18 to each of the second panel 14 and the third panel 16.

In the illustrated embodiment, a first locking pin 50 is disposed on the first coupling body 42 and a first locking pin aperture 52 is provided on the second coupling body 44. The first locking pin 50 is removably receivable in the first locking pin aperture 52 for removably locking the first and second coupling bodies 42, 44 to one another. Likewise, a second locking pin 54 is disposed on the second coupling body 44 and a second locking pin aperture 56 is provided on the first coupling body 42 wherein the second locking pin 54 is removably receivable in the second locking pin aperture 56 for also or further removably locking the first and second coupling bodies 42, 44 to one another.

Additionally, the second coupling body 44 includes a first locking pin latching member 60 slidably disposed thereon for selectively latching and locking the first locking pin 50. In particular, the latching member 60 is slidably movable between an unlocked position wherein the first locking pin 50 is receivable in the first locking pin aperture 52 and a lock position (shown in FIG. 3) wherein the first locking pin 52 can be selectively locked in the first locking pin aperture 54. In a like manner, the first coupling body 42 includes a second locking pin latching member 62 slidably disposed thereon for selectively latching and locking the second locking pin 54. In particular, the latching member 62 is slidably movable between an unlocked position wherein the second locking pin 54 is receivable in the second locking pin aperture 56 and a lock position (shown in FIG. 3) wherein the second locking pin 54 can be selectively locking in the second locking pin aperture 56.

With specific reference to FIG. 4, the first coupling body 42 will be described in further detail. It is to be appreciated that the second coupling body 44 can be constructed the same as the first coupling body 42 so any details described in reference to the first coupling body 42 are applicable to the second coupling body 44, though the second coupling body 44 can be oriented on the frame 30 in an axially reversed orientation relative to the first coupling body 42 on the frame 28 so that the first and second locking pins 50, 54 can be aligned with the first and second locking pin apertures 52, 56. Also it is to be appreciated that the construction of the first coupling body 42 shown and described herein is merely one exemplary construction and the exact construction shown and described herein is not required.

As shown, in the illustrated embodiment, the first coupling body 42 can include main body portions 64, 66 that include respective tubular apertures 64a, 66a in which the frame 28 is rotatably received (i.e., relative rotation between the frame 28 and the main body portions 64, 66 is uninhibited by the main body portions 64, 66). A bridging bracket 68 is fixedly secured to the main body portions 64, 66 thereby fixedly coupling the main body portions 64, 66 to one another. In particular, a plurality of fasteners 70, 72, 74, 76 secure the bridging bracket 68 to the main body portions 64, 66. Specifically, in the illustrated embodiment, the main body portions 64, 66 each define respective slotted surface 64b, 66b to which the bridging bracket 68 is secured. The second locking pin aperture 56 is defined into the slotted surface 66b of the main body portion 66 and the bridging bracket 68 defines a pin aperture 68a that is in registry with the second locking pin aperture 56.

The latching member 62 is slidably disposed along the main body portion 66, and particularly along the slotted surface 66b of the main body portion 66. More specifically, the latching member 62 includes a tab portion 62a disposed along the slotted surface 66b of the main body portion 66 and defining a latching aperture 62b for selectively latching and locking the first locking pin 54. In particular, the latching aperture 62b can be formed so as to have a tapered aperture portion 60c for more easily accommodating and guiding the second locking pin 54 and a seated portion 62d for holding the second locking pin 54 when latched by the latching member 62. The latching member 62 can be configured such that the latching member 60 partially deforms to snap fit around the second locking pin 54 when the second locking pin 54 is received in the second locking pin aperture 56 and the latching member 62 is slidably moved from the unlock position to the lock position.

Specifically, as the latching member 62 is slidably moved, positioning of the second locking pin 54 moves from the tapered entry portion 60c to the seated portion 62d to lock the first and second coupling bodies 42, 44 to one another. Accordingly, the latching member 62 is slidably movable about a longitudinal axis of the first coupling body 42, and specifically along the main body portion 66. The latching member 60, and particularly the latching aperture 60b thereof, deformably captures the second locking pin 54 when in the locked position with the second locking pin 54 received in the second locking pin aperture 56 on the first coupling body 42.

Additionally, the latching member 62 can define a slot 60e that receives the fastener 76 therethrough to limit axial sliding movement of the latching member 62 between the unlock position and the lock position. Further, the latching member 62 can include a collared portion 62f for receiving the frame 28 therethrough to thereby fix the position of the latching member 62 radially relative to the frame 28 and other components of the coupling body 56 (e.g. the main body portions 64, 66). For symmetry, another non-functioning latching member 78 can be disposed adjacent the main body member 64 that is constructed in a like manner to the latching member 62, though this is not required, the non-functioning latching member 78 can be fixed to the main body member 66 (i.e., not movable relative thereto). Bushings 80, 82 can be axially provided between the latching members 62, 78 and the respective main body portions 64, 66. As shown, a pin mounting plate 84 can be fixedly secured to the bridging bracket 68 by a fastener 86 and the first locking pin 50 can be disposed at one end of the pin mounting plate 84. A spacer 88 can be sandwiched between the bridging bracket 68 and the pin mounting plate 84.

For selectively locking relative rotation between the coupling device 40 and the frame 28, the coupling device 40, and particularly the first coupling body 42 additionally includes a gear member 90 rotatably fixed to the first panel 12, and particularly to the frame 28 of the first panel 12, and a gear locking member 92 rotatably affixed to the first coupling body 42 for selectively engaging the gear member 80 to rotatably lock the first coupling body 42 and the first panel 12 to one another. In particular, the gear member 90 is connected or integrated with the frame 28. In the illustrated embodiment, the frame 28 has ends 28a, 28b received into annular recesses (only one recess 90a shown) of the gear member 90 and the gear member 90 is rotational fixed to ends 28a, 28b of the frame 28 so as to rotate with the frame 28 and thus the first panel 12 when the first panel 12 is rotated. The gear member 90 further includes a toothed section 90b disposed circumferentially about the gear member 90 for selective locking by the gear locking member 92.

The gear locking member 92 is axially slidable relative to the first coupling body 42 and to the first gear member 90 for selectively disengaging from the first gear member 90 and allowing relative rotation between the first coupling body 42 and the first panel 12. In particular, the gear locking member 92 includes a tooth engaging portion 92a that engages with the toothed section 90b of the gear member 90 to lock relative rotation when the gear locking member 92 is in the locked position (the position shown in FIG. 3). When the gear locking member 92 is axially slid into an unlock position (not shown), the toothed section 92a is axially offset relative to the toothed section 90b to thereby allow relative rotation between the frame 28 and the first coupling body 42. As shown, the gear locking member 92 of the illustrated embodiment has a "C" shape and forms a cover that is disposed over the gear member 90 when in the lock position. Additionally, the gear locking member 92 can include raised tabs (only tab 92b shown) that engage with slots (only slots 64c and 66c shown) disposed on the main body portions 64, 66 to limit axially movement of the gear locking member 92.

Figure 5:
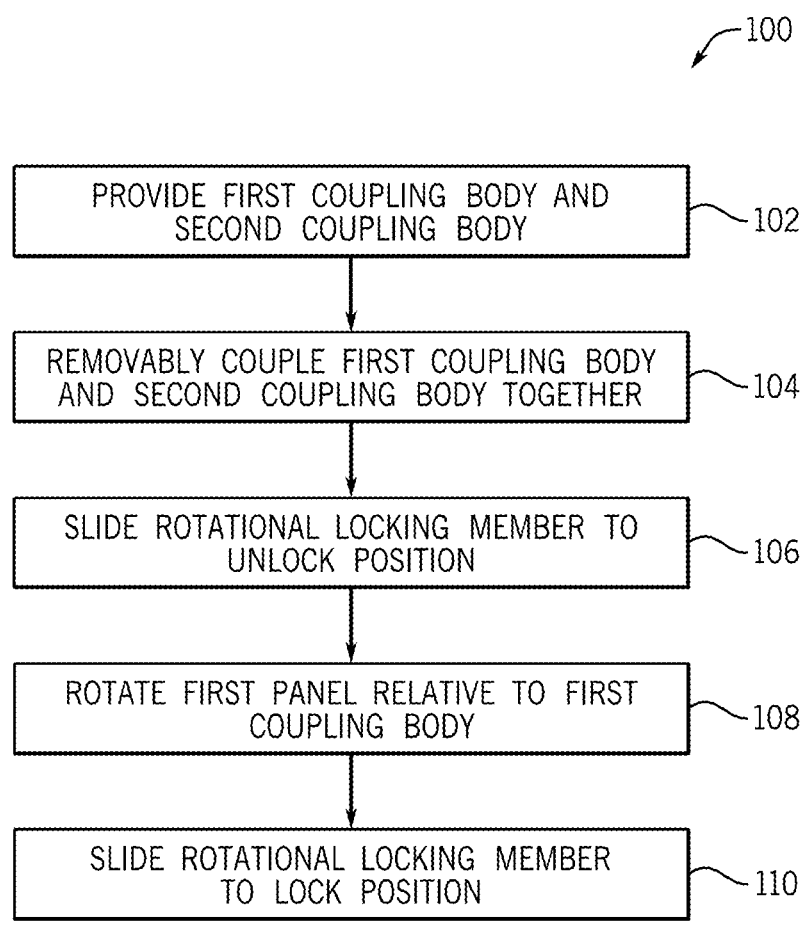
FIG. 5 is a process flow diagram of method for removably coupling panels of a modular panel system according to an exemplary embodiment of the present disclosure.

With reference now to FIG. 5, a method 100 for removably coupling panels of a modular panel system will now be described. In particular, in FIG. 5, the method will be described with particular reference to the panels 12, 14 of the modular panel system 10, and particularly will relate to the coupling device 40 described hereinabove. It is to be appreciated, however, that the method could be applied to any of the other panels (for example panels 16 and 18) of the modular panel system 10 or any connection between the panels 12, 14, 16, 18 in the modular panel system 10. Further, the method could be used with other modular panel systems and/or other panels and should not be considered limited to the modular panel system 10 discussed herein, nor to the coupling device 40 described herein.

In the method, at 102, the first coupling body 42 that is fixedly and rotatably secured to the first panel 12 and the second coupling body 44 that is fixedly and rotatably secured to the second panel 14 are provided. At 102, the first coupling body 42 and the second coupling body 44 are removably coupled together to removably couple the first and second panels 12, 14 to one another. As already described herein, removably coupling the first coupling body 42 and the second coupling body 44 together at 102 can include aligning the first locking pin 50 disposed on the first coupling body 42 with the locking pin aperture 52 disposed on the second coupling body 44. Also, removably coupling the first coupling body 42 and the second coupling body 44 together at 102 can include aligning the second locking pin 54 disposed on the second coupling body 44 with the second locking pin aperture 56 disposed on the first coupling body 42.

Still further, the step at 102 can include engaging respective planar portions or faces of the first and second coupling bodies 42, 44 with one another while inserting the pin or pins 50, 54 into the respective aperture or apertures 52, 56. In this regard, the slotted surface 66b together with the bridging bracket 68 received therein generally presents the planar surface or portion for the first coupling body 42. A similar or like planar surface or portion is provided in a like manner by the second coupling body 44. Additionally, removable coupling in step 102 can include the sliding of the latching member 60 onto the locking pin 50 to removably lock the first and second coupling bodies 42, 44 together. Likewise, the latching member 62 can be slid onto the second locking pin 54 to removably lock or further lock the first and second coupling bodies 42, 44 together.

The method 100 can further include, as indicated at 104, sliding the gear locking member on the first coupling body 42 to the unlock position to allow relative rotation between the first coupling body 42 and the first panel 12. Also at 104, the first panel 12 can be rotated relative to the first coupling body 46 while the gear locking member 92 is in the unlock position. Next, at 108, the gear locking member 92 can be slid on the first coupling body 42 back to the locked position to again inhibit or prevent relative rotation between the first coupling body 42 and the first panel 12.

These same steps 106, 108 and 100 can be repeated with respect to the second coupling body 44 and the second panel 14 as will be understood by those skilled in the art. Then, though not shown, the first and second coupling bodies 42, 44 can be decoupled from one another when desired to thereby decouple the first and second panels 12, 14 from one another.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A coupling device for coupling panels of a modular panel system, the device comprising:
   a first coupling body fixedly and rotatably secured to a first panel frame of a first panel at an end edge portion of the first panel;
   a second coupling body fixedly and rotatably secured to a second panel frame of a second panel at an end edge portion of the second panel, wherein the first and second coupling bodies are removably coupleable together to removably couple the associated first and second panels to one another;
   a gear member rotatably fixed to the first panel; and
   a gear locking member rotatably fixed to the first coupling body for selectively engaging the gear member to rotatably lock the first coupling body and the first panel to one another.

2. The coupling device of claim 1 further including:
   a first locking pin disposed on the first coupling body; and
   a first locking pin aperture provided on the second coupling body, the first locking pin removably received in the first locking pin aperture for removably locking the first and second coupling bodies to one another.

3. The coupling device of claim 2 further including:
a second locking pin disposed on the second coupling body; and
a second locking pin aperture disposed the first coupling body, the second locking pin removably received in the second locking pin aperture for further removably locking the first and second coupling bodies to one another.

4. The coupling device of claim 2 further including:
a first locking pin aperture latching member slidably disposed on the second coupling body and defining latching aperture, the latching member slidably movable between an unlock position wherein the first locking pin is receivable in the first locking pin aperture and a lock position wherein the first locking pin is removably locked in the first locking pin aperture.

5. The coupling device of claim 4 wherein the latching member is slidably movable about a longitudinal axis of the first coupling body, the latching member including a latching aperture that deformably captures the first locking pin when in the lock position with the first locking pin received in the first locking pin aperture.

6. The coupling device of claim 1 wherein the gear locking member is axially slidable relative to first coupling body and to the gear member for selectively disengaging from the gear member and allowing relative rotation between the first coupling body and the associated first panel.

7. The coupling device of claim 6 wherein the gear locking member forms a cover that is disposed over the gear member when in a locked position wherein the gear locking member is engaged with the gear member and is axially offset from the gear member when in a unlock position wherein the gear locking member is disengaged from the gear member.

8. The coupling device of claim 1 wherein the gear member is a first gear member and the gear locking member is a first gear locking member, and wherein the coupling device further includes:
a second gear member rotatably fixed to the associated second panel; and
a second gear locking member rotatably fixed to the second coupling body for selectively engaging the second gear member to rotatably lock the second coupling body and the associated second panel to one another.

9. The coupling device of claim 1 wherein the first coupling body includes a generally first coupling body planar face and the second coupling body includes a generally second coupling body planar face, the locking pin disposed on the first planar face and the locking pin aperture defined in the second coupling body planar face.

10. A coupling device for coupling frames of panels, comprising:
a first panel having a first panel frame;
a second panel having a second panel frame;
a first coupling body fixedly and rotatably connected to the first panel frame of the first panel at an end edge portion of the first panel;
a second coupling body fixedly and rotatably connected to the second panel frame of the second panel at an end edge portion of the second panel, wherein the first and second coupling bodies are removably coupled to one another in a coupled state to thereby couple the first panel and second panel together and are decoupled from one another in a decoupled state to thereby decouple the first panel and the second panel from one another; and
a locking mechanism including:
a locking pin disposed on the first coupling body that is removably lockable in a locking pin aperture disposed on the second coupling body to align and removable lock the first and second coupling bodies relative to one another, and
a rotational locking member slidably disposed on the first coupling body and movable between a lock position and an unlock position, wherein in the lock position the rotational locking member prevents rotation between the first coupling body and the first panel frame, and wherein in the unlock position the first panel is rotatable relative to the first coupling body.

11. The coupling device of claim 10 wherein each of the first panel frame and the second panel frame includes a tubular portion disposed at the respective end edge portion of the first and second panels, the first coupling body rotatably secured to the tubular portion of the first panel frame and rotatable about an axis of the tubular portion of the first panel, and the second coupling body rotatably secured to the tubular portion of the second panel frame and rotatable about an axis of the tubular portion of the second panel.

12. The coupling device of claim 10 further including:
a gear member rotatably fixed to the first panel frame of the first panel such that the gear member rotates with the first panel when the first panel is rotated; and
a gear locking member rotatably fixed to the first coupling body for selectively engaging the gear member to rotatably lock the first coupling body and the first panel to one another.

13. The coupling device of claim 12 wherein the gear locking member is axially slidable relative to first coupling body and to the gear member for selectively disengaging from the gear member and allowing relative rotation between the first coupling body and the associated first panel, and wherein the gear locking member forms a cover that is disposed over the gear member when in a locked position wherein the gear locking member is engaged with the gear member and is axially offset from the gear member when in a unlock position wherein the gear locking member is disengaged from the gear member.

14. The coupling device of claim 10 wherein the first coupling body includes a generally first coupling body planar face and the second coupling body includes a generally second coupling body planar face, the first coupling body planar face faces and abuts or nearly abuts the second coupling body planar face when the first coupling body is removably coupled together to the second coupling body.

15. A method for removably coupling panels of a modular panel system, comprising:
providing a first panel having a first panel frame;
providing a second panel having a second panel frame;
providing a first coupling body fixedly and rotatably secured to the first panel frame at an end edge portion of the first panel and a second coupling body fixedly and rotatably secured to the second panel frame at an end edge portion of the second panel;
removably coupling the first coupling body and the second coupling body together to removably couple the first and second panels to one another, and
sliding a rotational locking member on the first coupling body to an unlock position;

rotating the first panel relative to the first coupling body while the rotational locking member is in the unlock position; and sliding the rotational locking member to a lock position after rotating the first panel to a desired position, wherein in the lock position the rotational locking member prevents rotation between the first coupling body and the first panel frame.

16. The method of claim 15 wherein removably coupling the first coupling body and the second coupling body together includes:

aligning a locking pin disposed on the first coupling body with a locking pin aperture disposed on the second coupling body;

engaging respective planar faces of the first and second coupling bodies with one another while inserting the locking pin into the locking pin aperture; and sliding a latching member onto the locking pin to removably lock the first and second coupling bodies together.

17. The method of claim 15 further including:

sliding rotational locking member, wherein the rotational locking member is a gear locking member disposed on the first coupling body to an unlock position to allow relative rotation between the first coupling body and the first panel;

rotating the first panel relative to the first coupling body; and sliding the gear locking member on the first coupling body to a lock position to inhibit or prevent relative rotation between the first coupling body and the first panel.

* * * * *